United States Patent [19]

Chang

[11] 4,411,917

[45] Oct. 25, 1983

[54] FABRICATED SHELLFISH PRODUCTS CONTAINING WHEY PROTEIN CONCENTRATE COMPOSITION AND METHOD OF PREPARATION

[75] Inventor: Pei K. Chang, Montrose, N.Y.

[73] Assignee: Nutrisearch Company, Cincinnati, Ohio

[21] Appl. No.: 324,321

[22] Filed: Nov. 23, 1981

[51] Int. Cl.$^3$ .......................... A23J 3/00; A23L 1/33
[52] U.S. Cl. .................... 426/104; 426/574; 426/643; 426/657; 426/802
[58] Field of Search ............... 426/104, 574, 583, 643, 426/657, 802

[56] References Cited

U.S. PATENT DOCUMENTS 3,607,315  9/1971  Partyka ................................ 426/643
3,852,487 12/1974  Van Werven et al. ............. 426/643
3,875,313  4/1975  Brotsky ........................... 426/643 X
3,935,323  1/1976  Feminella et al. .............. 426/583 X
4,168,322  9/1979  Buckley et al. ................. 426/657 X
4,218,490  8/1980  Phillips et al. ................. 426/643 X Primary Examiner—Robert A. Yoncoskie
Attorney, Agent, or Firm—Cushman, Darby & Cushman

[57] ABSTRACT

A fabricated seafood product is prepared by shaping a blend of seafood meat and as a binding agent therefor a combination comprising a whey protein concentrate composition having at least 30% protein wherein at least 50% of the protein in the whey protein concentrate composition is whey protein, and either (a) from about 1.25% to about 3% sodium tripolyphosphate or (b) from about 0.4 to about 1.25% sodium tripolyphosphate in combination with a food grade, nonphosphorus-containing alkalizing agent, the pH of said fabricated seafood product being within the range of from about 7.0 to about 7.75.

40 Claims, No Drawings

FABRICATED SHELLFISH PRODUCTS CONTAINING WHEY PROTEIN CONCENTRATE COMPOSITION AND METHOD OF PREPARATION

BACKGROUND OF THE INVENTION

1. Field of the Invention

The present invention relates to fabricated food products, and particularly, fabricated shellfish products.

2. Discussion of Prior Teachings

Shellfish, crustacea and mollusks are major food sources which are becoming expensive and scarce.

Attempts are presently being made to utilize low quality parts and pieces resulting from processing or undesirable small size materials to prepare quality food products which command a higher price. For instance, fabricated shrimp can be prepared by extruding comminuted shrimp and a binder such as texturized vegetable protein or alginate (cured with calcium into a gel). However, some of these products have deficiencies in flavor and texture. Fabricated shrimp must be made from an extrudable mass, and must be capable of machine handling in such treatments as boiling, breading and freezing as well as having freeze-thaw stability. Fabricated shrimp without a binder tends to disintegrate on boiling.

In Ser. No. 300,722, filed Sept. 10, 1981, it is disclosed that a fabricated shellfish product which overcomes these problems can be prepared by extruding a mixture of small size shellfish meat using a total or partial binder of a whey protein composition having at least 30% protein, e.g. a whey protein concentrate and more preferably from a whey protein concentrate which has been treated to reduce the thermogelation temperature thereof. While the product overcomes some deficiencies, other deficiencies such as texture could be improved. It was also noted that an emulsified blend was too soupy for immediate extrusion and had to set for 30-60 minutes before it could be extruded.

It is known that sodium tripolyphosphate at a level of 0.05% is used in a commercial fabricated shrimp product. The effect of this amount on texture is considered to be minimal.

THE INVENTION

In accordance with the present invention, an improved fabricated seafood product can be prepared by shaping a blend of a major proportion of comminuted seafood meat, and, as a total or partial binding agent therefore, a combination of a whey protein concentrate composition having at least 30% protein, wherein at least 50% of the protein in the whey protein concentrate composition is whey protein and a member selected from the group consisting of (a) from about 1.25% to about 3% sodium tripolyphosphate and (b) from about 0.4 to about 1.25% sodium tripolyphosphate in combination with a food grade, nonphosphorus-containing alkalizing agent, the pH of said fabricated seafood product being within the range of from about 7.0 to about 7.75. A fabricated and handleable product of good taste and texture is provided which can be consumed as a breaded or non-breaded product, boiled or fried, hot or cold. The emulsified blend is of sufficient consistency to allow immediate extrusion.

DETAILED DESCRIPTION OF THE PRESENT INVENTION

The term "seafood" is intended to include meats from fish, shellfish including crustacea and mollusks, rays and warm blooded sea mammals. The shellfish meats which can be used in preparing the products of the invention include meats from the crustacea, such as crab, lobster, shrimp and crayfish as well as from mollusks including cephalopods such as scallops, clams, oysters, muscles, abalone, squid, and octopus. Turtle and terrapin are also intended to be included within the definition of shellfish as used herein. It is also intended that the term "shellfish" include blends of shellfish meats in addition to the meat of one species.

The shellfish meats are used in any proportion of the meat, the remainder being other meat or fillers, preferably, seafood products such as fish, eel, and the like. Preferably, the meat portion is substantially 100% shellfish meat.

The shellfish meat can be whole, pieces, comminuted and blends thereof. Lower quality materials such as extremely small shrimp (444-888 per kilogram) can be effectively processed in accordance with the invention. Scraps or pieces can also be processed to form upgraded products.

The shellfish meat can be raw and preferably in a shelled, raw, cleaned state. The meat can be frozen in individual pieces or blocks as is common in the industry. Methods for processing crustacea and mollusks as well as turtle, are disclosed in "Food Products Formulary", Vol. 1, "Meats, Poultry, Fish and Shellfish", by S. L. Komarik et al., Avi Publishing Co., 1974, the disclosure of which is hereby incorporated by reference.

The fish meats which can be used alone or in combination with shellfish in preparing the products of the invention include meats from any fresh or salt-water fish. These are illustrated by albacore, anchovy, bass, bonito, carp, cod, dogfish, flounder, haddock, hake, halibut, herring, kawakawa, lusk, mackerel, perch, pollack, rockfish, sablefish, salmon, sardines, shad, skipjack, sole, swordfish, sturgeon, tunny (tuna), whiting, surimi (a processed and washed form of fish) and the like. The fish flesh processed in accordance with the invention is generally in a raw form. The fish flesh can be prepared as is usual in the industry by separating the flesh from the bones and skin of cleaned fish by hand or mechanically (see Komarik et al., ibib, page 271). For some purposes, such as pet food, the entire cleaned fish can be ground to provide the fish flesh. The fish flesh can be immersed in a brine solution for cleaning or pickling or in a brine/phosphate solution to reduce drip loss (U.S. Pat. No. 3,036,923).

The whey protein concentrate composition used in the invention contains at least 30% protein of which at least 50% must be whey protein. The remainder can be derived from other protein sources including dairy proteins, animal proteins and vegetable proteins.

Whey protein concentrate compositions which are soluble or swellable in water are useful for the practice of this invention. Both gelling and non-gelling types of water soluble or swellable whey protein concentrate compositions act as effective binding agents for the products described herein. Gel-forming whey protein concentrate compositions are defined as those capable of forming a gel at 15% total whey protein composition solids in water within about at least 30 minutes when heated at 85° C., these being preferred.

The whey protein concentrate composition must be able to form a gel at approximately the same pH as the meat system in which it is used. Since the whey protein composition will not form a gel at acidic pH's below 5.5, foods such as pureed strawberries which cause the pH of the whey protein composition to fall below that level will not gel.

The whey protein concentrate used in the invention can be derived from either acid whey or sweet whey though acid whey is a desired source. Acid whey, including cottage cheese whey or casein whey, is the byproduct obtained from the acid precipitation of milk protein by the use of a lactic acid producing bacteria or by the direct addition of a food grade acid.

The whey can also be derived from the production of cheddar cheese, which is commonly produced by the rennet coagulation of protein. This cheese whey is commonly called "sweet" or "cheddar cheese whey". Whey from other cheeses which are either acid or sweet can also be used as the source of the whey protein.

The whey protein concentrate as used in the invention is more preferably derived from 100% acid cheese whey though less than 50% and preferably less than 20% by weight of the other cheese wheys can be used. The whey protein concentrate may have a pH in the range from about 3.0 to about 10.0, with a pH range of from 6.0 to 7.5 being preferred.

Whey protein concentrate is defined as any whey product having more than 30% by weight protein (dry basis). Processes which can be utilized to prepare whey protein concentrates include ion exchange, electrodialysis, which may be preceded or followed by partial lactose removal, (Stribley, R. C., Food Processing, Vol. 24, No. 1, page 49, 1963), Reverse Osmosis (Marshall, P. G. et al., Fractionation and Concentration of Whey by Reverse Osmosis, Food Technology 22(8) 969, 1968, Gel Filtration (U.S. Pat. No. Re. 27,806), and Ultrafiltration, Horton, B. S. et al., Food Technology, Volume 26, p. 30, 1972 and ion exchange. Chemical methods such as phosphate precipitation as described in U.S. Pat. Nos. 2,388,624 and 4,043,990 as well as sodium lauryl sulfate precipitation as described in U.S. Pat. Nos. 4,029,825 and 4,058,510 can be used if the products prepared from these chemical precipitation methods otherwise correspond to the requisites for the whey protein concentrate.

It has been found that the most effective results have been obtained using an ultrafiltered acid whey protein concentrate containing at least about 40% whey protein. In a typical process, cottage cheese whey is neutralized to a pH of about 6.4 with 50% caustic. After storage, the pH is then adjusted to about 7.2 and any solids or precipitates are removed by centrifugal clarification. The clarified liquor, after pasteurization, is fed into an ultrafiltration membrane unit. The retentate is condensed and spray dried. Protein products of 35% by weight (dry basis) or more whey protein are efficiently prepared by this process. One of the more preferred products prepared by this process generally comprises from about 40% to about 60% whey protein based on Total Kjeldahl Nitrogen, 10–30% lactose, 3–15% ash and 0.1–4% fat. It is preferred to use a product in a dry form to avoid the need for refrigeration though a liquid whey protein concentrate can also be used.

It is particularly preferred to utilize, as the whey protein concentrate, a product which has been treated to reduce the thermal gelation temperature such as by the treatment of the protein with sulfite and, preferably, in accordance with the method disclosed in Ser. No. 95,684, filed Nov. 19, 1979, and now abandoned, the disclosure of which is incorporated herein by reference. The process as described in the copending application comprises the steps of (a) preparing a solution of whey protein in water at a temperature of less than about 30° C. at between 0.5% and 20% by weight total protein content wherein the pH of the solution is within the range of from about 8 to about 10, preferably 9–10, the total dissolved protein content being less than about 15% when determined at said pH; (b) heating the alkaline solution to a temperature within the range of from about 50° C. to about 80° C. (insufficient temperature to cause gelation); (c) cooling to a temperature below 30° C. and about 2° C. within at least 60 minutes after reaching the elevated temperature at a rate sufficient to prevent any further substantial change in the protein structure; and (d) adjusting the pH below pH 8 and preferably within the range of from about 6 to 8 simultaneously with or subsequent to cooling. Cooling is generally initiated within 1 hour and preferably within 30 minutes after the temperature of the solution has reached its maximum level. Cooling is conducted at a rate sufficient to prevent any further substantial change in the protein and to avoid gelation of the protein containing solution.

The protein treated by the process, is substantially soluble at an alkaline pH of between 8 and 10. It is preferable that the protein from the protein source be at least 50% by weight soluble and preferably at least 75% and more preferably at least 100% soluble at the alkaline pH of the process. At least 50% by weight of the protein is preferably any whey protein concentrate. The protein can contain minor amounts of protein from other sources including dairy such as milk and whey byproducts and whey, vegetable such as soy, cottonseed, peanut and the like, soluble meat proteins such as those obtained from red meat, poultry and fish as well as egg and blood albumens. Preferably, the whey protein material which is treated is a whey protein concentrate provided by the processes previously discussed. The whey protein concentrate should contain at least 30% by weight (dry basis) and preferably from about 40% to about 60% protein based on Total Kjeldahl Nitrogen. Processing which substantially denatures the whey protein such as high heat, strong chemicals and electrodialysis under extreme conditions should be avoided. It has been found that the most effective results obtained using an ultrafiltered acid whey concentrate containing from about 40% to about 60% by weight (dry basis) protein. The process for obtaining such a product has been previously described as well as its composition. Any food grade alkalizing agent such as sodium or potassium hydroxide and preferably sodium hydroxide can be used to adjust pH. Other methods of elevating the pH such as by the use of an anionic/cationic exchange resin can be used. Sufficient agitation is utilized to avoid localization of high pH.

The alkaline whey solution is heated to a temperature within the range of from about 50° C. to about 80° C., the temperature being elevated as fast as possible without causing protein insolubilization. The maximum heating time is the gelation point of the protein. The heating time is preferably not over a maximum of about 1 hour and more preferably less than about 30 minutes, and most preferably less than about 15 minutes. After alkalization and heating, the product is cooled within a period of about 15 minutes to reduce the temperature below that at which further change in protein structure occurs and preferably to room temperature. Simultaneously or subsequent to cooling, the pH is adjusted to a range of from about 6 to about 8 and preferably from about 6.5 to about 7.5 with any food grade acid. Sufficient agitation should be utilized to avoid localized conditions of acid build-up.

The whey protein concentrate can be treated along with alternate protein sources. Blends of about 50% by weight whey protein concentrate and about 50% by weight (dry basis) egg albumen and preferably from about 75% to about 100% whey protein concentrate and from about 25% to about 0% egg albumen can be effectively processed together. The percentages are by weight based on the dry solids weight of the whey protein concentrate and the albumen. Processing times for blends are disclosed in Ser. No. 95,684.

The product prepared by the process of Ser. No. 95,684, or whey protein concentrates in general can be used in amounts of at least 50% by weight and more preferably at least 75% and most preferably 100% whey protein concentrate including modified whey protein concentrate with the remaining protein comprising blends of other proteins modified by the process of Ser. No. 95,684 of non-modified proteins such as milk, alkali metal caseinates, unmodified whey proteins including dry whey, delactosed whey, delactosed demineralized whey, the dried permeate and delactosed permeate resulting from the ultrafiltration of whey, the precipitate prepared by neutralizing acid whey as disclosed in U.S. Pat. No. 4,036,999 and the precipitate prepared by adding calcium ion to sweet whey followed by neutralization as disclosed in U.S. Pat. No. 3,560,219 as well as the dried mother liquor remaining after separation of these precipitates, vegetable proteins such as soy proteins and soluble protein such as egg albumen and blood albumen whole egg and egg yolk.

The whey protein concentrate composition is combined with sodium tripolyphosphate and optionally an alkalizing agent to prepare the binding agent. The sodium tripolyphosphate can be used in amounts ranging from about 0.4% to about 3%, though an alkalizing agent is generally used with the STP in the range of 0.4% to 1.25%. The alkalizing agents which can be used are edible (food grade) nonphosphorus-containing compounds illustrated by sodium hydroxide, potassium hydroxide, calcium hydroxide, sodium carbonate, sodium bicarbonate, sodium citrate, and the like. The preferred compounds are sodium carbonate and sodium bicarbonate, the former being most preferred.

The sodium tripolyphophate is generally used in an amount ranging from about 1.25% to 3% and preferably from about 1.4% to about 1.6% when used alone (without an alkalizing agent). The sodium tripolyphosphate, when used with an alkalizing agent, is generally used in an amount within the range of from about 0.4% to about 1.25%, preferably from about 0.4% to about 0.6%. The preferred alkalizing agent sodium carbonate is generally used in an amount ranging from about 0.05% to about 0.15%. The amount of sodium tripolyphosphate alone or in combination with an alkalizing agent is designed to provide a final product with a pH within the range of from about 7.0 to about 7.5 and preferably to about 7.5. The alkalizing agent is used to increase the pH in those cases where the sodium tripolyphosphate does not provide the pH level desired.

The percentage of sodium tripolyphosphate as well as the alkalizing agent are on a weight basis based on the combined weight of the seafood, the whey protein concentrate composition and the sodium tripolyphosphate (and alkalizing agent if present).

The whey protein concentrate composition can be dissolved in water and added to the seafood, in liquid or dry form alone or in combination with the sodium tripolyphosphate (and alkalizing agent). Other flavoring agents, flavor enhancers, humectants, stabilizers, preservatives or natural and artificial flavors and colors can also be added. The general ingredients incorporated in fish spreads can be included in fish based products of the invention (see Komarik et al., ibid, page 300). The concentrate can also contain from about 0.3% to about 0.6% of a molecularly dehydrated noncyclic alkali metal (Na or K) phosphate having an alkali metal oxide to phosphorus pentoxide ratio of from about 0.9 to 1 to about 2 to 1 such as sodium tripolyphosphate (STP), sodium hexametaphosphate (SHMP), and tetrasodium pyrophosphate (TSPP), for improved cook yield and water holding. These ingredients can be added individually to the meat or in coblends as is appropriate.

The blend of the seafood and the whey protein concentrate composition can be prepared by dry blending or liquid blending the ingredients under such conditions that an intimate mixture is obtained. For uniformity, the intimate blending of seafood can be accomplished in a meat chopper such as that referred to in the industry as a "silent cutter". Other equipment useful in the industry for preparing comminuted and blended products can also be effectively used such as a food processor. The seafood meat can be partially chopped prior to the addition of the protein and flavoring of other ingredients. If desired, the chopped material can also be emulsified.

The whey protein concentrate composition binding agent including the STP (and alkalizing agent if present), either alone or in combination with other binding agents, is used in an amount sufficient to effectively bind together the seafood meat. The binding agent can also be used in an amount above that needed for binding if it is desired to use the whey protein concentrate composition as a filler. Since the binding agent of the invention can be used as a partial binding agent, the term "amount sufficient to effectively bind" is intended to include that amount needed to bind the seafood meat together in combination with all other binders in the system. The binding agent is preferably used in an amount of from 5% and above. For practical purposes, the upper limit of the binding agent is about 50%, preferably 15% and most preferably from about 7.5% to about 12.5% (dry basis based on the total weight of the meat and whey protein concentrate composition before cooking).

The blends of meat and the binding agent can be shaped into products resembling the original shape of the source of the meat such as shrimp, fish, lobster, and the like or in convenient forms such as rolls, loaves, cakes, sausage links, fish sticks, balls, cubes patties and the like. The shaping can include covering a core of food with the blends of the invention such as covering pickles with a fish blend to provide a product similar to rollmops. Shaping can be accomplished using extruding techniques, molding techniques using pressure and non-pressure modes, other shaping containers such as cooking containers, casings and the like as is well known to a skilled artisan.

Shellfish of small size, i.e., less than about 2 centimeters in length, can also be formed into larger pieces without further comminuting using the binding agent of the invention. Large pieces of fish can be bound together to form blocks from which fillets and sticks can be cut.

The shaped articles are then further processed to hold the formed shape such as by drying, freezing, and/or cooking. The shaped article can be bound by the binding agent during the final or pre-cooking. In other instances, the shaped article can be blanched or cooked or prefried before or after other surface treatments such as breading or wrapping with another food. Light blanching may be preferred to set the outer surface and form a skin to set the shape leaving the final setting to be accomplished during cooking. The material forming the shaped article can also include agents to assist in setting the shape until other manufacturing processes can be accomplished. For instance, an alginate can be blended with the binding agent and the shape set by applying a calcium salt at least to the surface (see U.S. Pat. No. 3,650,766). Further, certain poducts such as spreads may require only a light cooking to set the texture of the spread. The flesh can also be formed into other seafood shapes such as shrimp or lobster along with natural or artificial flavors and colors to form imitation seafood products.

The products of the present invention can be conveyed in frozen form to the consumer or the industrial market. Frozen products can be sold to the food service industry breaded or unbreaded where the breading can be added just prior to final cook. The products of the invention can be utilized in shaped form either hot (boiled or deep fat fried) or cold (for instance, a shrimp product in a shellfish salad). Chunks prepared from smaller pieces can be used as additives in preparing either liquid or dry soups and stews as well as salads such as chicken soups or salad. Because of the binding capabilities of the whey protein concentrate, the fabricated product can be subjected to boiling without disintegration of the product.

As used in the specification and claims herein, all percent protein are based on Total Kjeldahl Nitrogen (TKN) using the specific factor of 6.38 for dairy protein or other factors relevant to other protein systems.

The present invention is illustrated in the Examples which follow:

EXAMPLE 1

The modified whey protein concentrate used in the following examples can be prepared by the following illustrative technique.

The retentate from the ultrafiltration of acid whey containing about 50% protein on a dry solids basis was diluted with water from a total solids content of about 19% to a total solids content of about 18.4%. A sufficient amount of caustic was added to the diluted retentate to elevate the final pH from about 7 to about 9.2. The alkaline diluted retentate was heated in a pasteurizer to about 75° C. The hold time in the pasteurizer was 16–20 seconds. The heated product was cooled to about 23° C. Phosphoric acid was added to the cooled product to lower the pH to about 7. The product was then spray dried.

A 15% solution of the modified whey protein concentrate as provided in this example when heated at 70° C. formed a gel within 30 minutes.

The modified whey protein concentrate product as used in the following examples had the following approximate composition:

| | |
|---|---|
| Protein | 50.7% |
| Lactose | 28.2% |
| Ash | 8.7% |
| Moisture | 4.2% |
| Fat | 0.3% |
| Lactate | 2.3% |
| Citrate | 6.8% |

EXAMPLE 2

Extruded shrimp were prepared using the following formulation:

| Ingredients | Weight % |
|---|---|
| Shrimp (650–1100/kg.) | 74.4 |
| Modified Whey Protein Concentrate | 15.0 |
| Water | 10.0 |
| Salt | 0.3 |
| Corn Starch | 0.3 |

The extruded shrimp were prepared from frozen shrimp which were thawed and drained. These were ground in a food processor for about 1 minute. The whey protein concentrate, salt and starch were added to the shrimp and the blend was ground for another minute in the food processor. The alkalizing agent (if used) listed in the Table below was dissolved in ½ the water and the pH determined. After blending in the alkalizing agent with the shrimp blend with a spoon and determining the pH, the remainder of the water was added and blended in with a spoon. The mixture was extruded into 2 inch lengths onto waxed paper using a handheld extruder. The lengths were frozen, partially thawed, breaded with a batter of 50% cake flour, 48% corn starch and 2% salt, mixed 2 parts water to 1 part batter mix. The shrimp were dipped in batter, rolled in bread crumbs, dipped again and rolled again and finally refrozen.

Three samples were prepared, the first using 1.5% sodium tripolyphosphate (STP), the second containing 0.5% sodium tripolyphosphate (STP) and 0.1% sodium carbonate and the third being a control (no added alkalizing agent). The percentages of STP (and alkalizing agent if used) are by weight such that the total of the formulation and the STP (and alkalizing agent) equals 100%. The results obtained are shown in the following Table:

TABLE I

| | No Preference | 1.5% STP | 0.5% STP 0.1% Na$_2$CO$_3$ | Control |
|---|---|---|---|---|
| Number of Preference | 1 | 9.0 | 3.0 | 2.0 |
| Flavor Score | — | 5.3 | 4.7 | 4.6 |
| Texture Score | — | 5.3 | 4.1 | 3.7 |
| % Weight Loss Upon Frying (350° F., 2 min.) | — | 5.6 | 0.02 | 17.9 |
| Number of Splits Per 16 Shrimps | — | 10.0 | 16.0 | 9.0 |

In comparison to the least preferred control, a majority (9 out of 15) of the panel members preferred the shrimp containing 1.5% STP. Even though only 3 panel members preferred the shrimp containing 0.5% STP plus 0.1% Na$_2$CO$_3$, it had the minimum cooking loss upon frying (0.02%). However, the shrimp batter did have more splits during frying due to the release of $CO_2$ from $Na_2CO_3$.

The use of tetrasodium pyrophosphate or trisodium phosphate in place of the sodium tripolyphosphate did not show any significant improvement on the texture of the shrimp in comparison to the untreated control.

The use of sodium carbonate at a 0.5% level in place of the STP produced shrimp with an extremely high pH value (8.75) and a crumbly texture.

The inclusion of 1.0% tapioca starch into shrimp containing sodium tripolyphosphate and sodium carbonate did not improve the texture.

EXAMPLE 3

The procedure of Example 2 was repeated using various alkalizing agents. The shrimp were tested by an informal taste test panel of 2 people, the following results were obtained:

TABLE III

| Alkalizing Agent | Amount | pH | Comments on Extrusion | Taste/ Texture |
| --- | --- | --- | --- | --- |
| (a) Sodium Tripolyphosphate | 1.5% | 7.35 | very sticky | soft and juicy |
| (b) Trisodium Phosphate | 0.5% | 7.50 | good texture | rubber, tough salty, slightly |
| (c) Sodium Citrate | 2.0% | 7.28 | good texture | tough |
| (d) Tetrasodium Pyrophosphate | 0.5% | 7.26 | TSPP low solubility, texture O.K. | slightly tough starchy |
| (f) Control | 0 | 6.92 |  | dry, tough, flat |

Sodium bicarbonate at a 0.5–1.0% level in shrimp generated significant amounts of carbon dioxide during frying. The released carbon dioxide is believed responsible for cracking the batter of the shrimp during frying.

EXAMPLE 4

The addition of 1–1.5% sodium tripolyphosphate improves extrusion of fabricated shrimp products.

Materials

Various test formulations of extruded fabricated shrimp products were prepared using the following general formulation:

| Ingredient | Weight % |
| --- | --- |
| Shrimp (650 to 1100 count/kg.) | 72.9 |
| Modified Whey Protein Concentrate Composition | 15.0 |
| Water | 10.0 |
| Salt | 0.3 |
| Corn Starch | 0.3 |
| Sodium Tripolyphosphate | 1.5 |

Method

The formulations of this example were prepared by the following procedure:

1. Shrimp were thawed and drained. If necessary, cold tap water was added to obtain the original shrimp weight.
2. Shrimp was mixed with the selected whey.
3. Salt, starch and sodium tripolyphosphate were dissolved in water and the water solution added to the shrimp mixture.
4. Mixture of step (3) was emulsified (Stephan Emulsifier—Model No. MCV-12B).
5. Emulsified product of step (4) was extruded (Autoprod Extruder).
6. Product of step (5) was frozen to set.
7. Product of step (6) was treated with batter and breading.

The following batter/breading sequence was used:
(a) Batter (Modern Maid Batter No. 4277 dissolved at a ratio of 3 parts water to 1 part batter mix).
(b) Breading (Newly Weds Breading No. 3159).
(c) Batter (Modern Maid White Batter No. 4065 dissolved 3 parts water to 1 part batter mix).
(d) Japanese bread crumbs (Modern Maid Breading No. 6062).

Without the addition of sodium tripolyphosphate, the shrimp emulsion of step 3 was soupy and a holding time of from about 30 to about 60 minutes in the cooler was required in order to obtain a consistency suitable for extrusion.

The addition of 1.5% sodium tripolyphosphate completely eliminated this holding requirement. The shrimp emulsion was firm and ready for extrusion immediately after emulsification.

EXAMPLE 5

The effect of sodium tripolyphosphate at 1.0% and 1.5% in the formulation of Example 4 was determined. Based on taste panel results, shrimp made with 1.5% sodium tripolyphosphate were more preferred than the shrimp containing 1.0% sodium tripolyphosphate.

TABLE II

|  | No Preference | 1.5% STP | 1.0% STP |
| --- | --- | --- | --- |
| Number of Preference | 2 | 10.0 | 3.0 |
| Flavor Score | — | 4.9 | 4.3 |
| Texture Score | — | 4.8 | 4.3 |
| % Weight Loss Upon Frying (177° C., 2 min.) | — | 5.7 | 6.8 |
| Number of Splits Per 16 Shrimps | — | 8.0 | 11.0 |

EXAMPLE 6

Various extruded shrimp products were prepared using the procedure of Example 2 and the formulations shown in the following table:

TABLE IV

| | Extruded Shrimp Formulations (%) | | |
| --- | --- | --- | --- |
| Ingredient | Control | Sample 6A | Sample 6B |
| Shrimp (650 to 1100 count/kg.) | 74.7 | 74.1 | 73.1 |
| Whey Protein Concentrate prepared according to the method of Example 1 | 15.0 | 15.0 | 15.0 |
| Water | 10.0 | 10.0 | 10.0 |
| Salt | 0.3 | 0.3 | 0.3 |
| Sodium Tripolyphosphate | — | 0.5 | 0.5 |
| Sodium Carbonate | — | 0.1 | 0.1 |
| Tapioca Starch | — | — | 1.0 |

The formulations shown in the above table were evaluated by a 15-member taste panel. The sample containing the sodium tripolyphosphate and sodium carbonate (6A) had a pH value of 7.47 and the control a pH value of 6.93. During the frying the sample containing the sodium carbonate floated on the cooking fat, probably due to released carbon dioxide.

A 15-member taste test panel found sample 6A (contains STP and Na₂CO₃) most preferred, and the control the least preferred. The addition of tapioca starch did not improve the results of 6A. The results are reported as follows:

TABLE V

Taste Panel Evaluation of Extruded Shrimp Products

|  | No Preference | Control | Sample 6A | Sample 6B |
|---|---|---|---|---|
| Number of Preference | 1 | 3.0 | 7.0 | 4.0 |
| Flavor Score | — | 4.2 | 5.1 | 5.1 |
| Texture Score | — | 4.7 | 4.9 | 4.9 |

EXAMPLE 7

Blends of shrimp and fish were prepared using the following formulation and procedure:

| Ingredient | 7A | 7B | 7C |
|---|---|---|---|
| Shrimp | 32.9 | 33.4 | 65.8 |
| Turbot | 32.9 | 33.4 | — |
| Whey Protein Concentrate prepared according to the method of Example 1 | 15.0 | 15.0 | 15.0 |
| Water | 15.0 | 15.0 | 15.0 |
| Flavoring | 2.8 | 2.8 | 2.8 |
| Sodium tripolyphosphate | 1.5 | 0.5 | 1.5 |

Procedure

1. Shrimp were thawed and drained. If necessary cold tap water was added to obtain the original shrimp weight.
2. The fish was ground through a 1.25 centimeter plate.
3. The shrimp and the fish were mixed and the whey protein concentrate, a solution of the sodium tripolyphosphate in the water and the flavoring were added sequentially.
4. After blending well, the mixture was emulsified (Stephan Emulsifier—Model No. MCV-12B).
5. The emulsified product of step 4 was extruded (Autoprod Extruder).
6. The extruded products were frozen to set.
7. The frozen product was battered and breaded (Batter (C) and breading (D) of Example 4).

A 15 member taste test panel evaluated the formulations with the following results:

TABLE VI

Taste Panel Evaluation of Extrude Shrimp - Fish Products

| | Effect of | No | 7A | 7C |
|---|---|---|---|---|
| A. | 50% Fish | Preference | (50/50) | (Control) |
| | Number of Preferences | 2 | 7 | 6 |
| | Flavor | — | 5.1 | 11.8 |
| | Texture | — | 4.7 | 4.6 |
| | Effect of Level | No | 7A | 7B |
| B. | of Sodium Triphosphate | Preference | (1.5%) | (0.5%) |
| | Number of Preferences | 1 | 10 | 4 |
| | Flavor | — | 5.1 | 4.6 |
| | Texture | — | 5.1 | 4.1 |

It was also attempted to reduce the air in the emulsion by subjecting the same to a vacuum treatment before extruding. No essential difference was noted between the vacuum treated sample and a control.

The exploding or splitting action observed in the deep fat fryer of the shrimp may be eliminated in some cases by storing the shrimp under frozen conditions, e.g., −20° C.±2° for at least 48 hours prior to deep fat frying.

What is claimed is:

1. A fabricated seafood product comprising a major proportion of seafood meat and a binding agent comprising:
   (1) a whey protein concentrate composition having at least 30% protein, wherein at least 50% of the protein in the whey protein concentrate composition is whey protein; and
   (2) a member selected from the group consisting of: (a) from about 1.25% to about 3% sodium tripolyphosphate, and (b) from about 0.4 to about 1.25% sodium tripolyphosophate in combination with a food grade, nonphosphorus-containing alkalizing agent,
   the pH of said fabricated seafood product being within the range of from about 7.0 to about 7.75.

2. The product of claim 1 wherein the whey protein concentrate composition is derived by a process selected from the group consisting of ion exchange, electrodialysis, reverse osmosis, gel filtration, ultrafiltration, and chemical precipitation.

3. The product as recited in claim 1 wherein said seafood meat is shellfish meat.

4. The product as recited in claim 3 wherein said shellfish meat is derived from a crustacea.

5. The product as recited in claim 4 wherein said crustacea is shrimp.

6. The product as recited in claim 5 wherein said shrimp are of a size ranging from about 650 to about 1100 per kilogram.

7. The product as recited in claim 1 wherein said binding agent is present in said product prior to cooking in an amount ranging from about 5% to about 50% by weight on a solids basis based on the total weight of the product prior to cooking.

8. The product as recited in claim 1 wherein said composition comprises from about 75% to about 100% by weight of a whey protein concentrate having more than 30% by weight whey protein on a dry solids basis and from about 25% to 0% of another protein containing material.

9. The product as recited in claim 8 wherein said whey protein concentrate is derived by ultrafiltration and has from about 40% to about 60% by weight whey protein on a dry solids basis.

10. The product of claim 9 wherein the whey protein concentrate is derived by ultrafiltering acid whey.

11. The product as recited in claim 1 wherein said whey protein concentrate is a treated concentrate characterized by a lowered gelation temperature and which forms a gel within 30 minutes when an aqueous solution of 15% solids is heated at 70° C.

12. The product as recited in claim 11 wherein said lowered gelation temperature whey protein concentrate is prepared by a process comprising:
   (a) adjusting the pH of an aqueous solution of a whey protein concentrate having a temperature of less than about 30° C. to a pH within the range of from about 8 to about 10, the total dissolved protein content being less than about 15% when determined at said pH;

(b) heating the alkaline solution of step (a) to an elevated temperature within the range of from about 50° C. and about 80° C.;

(c) cooling said heated solution to a temperature within the range of from about 30° C. to about 2° C. within 30 minutes after the said solution reaches said elevated temperature, said cooling being conducted at a rate sufficient to prevent gelation of the whey protein containing solution.

13. The product as recited in claim 11 wherein the seafood is shellfish and the composition is used in an amount ranging from about 5% to about 50% by weight on a solids basis based on the total weight of the uncooked product.

14. The product as recited in claim 5 which is extruded in the shape of a shrimp.

15. The product as recited in claim 1 wherein said member is sodium tripolyphosphate.

16. The product as recited in claim 15 wherein said sodium tripolyphosphate is present in an amount ranging from about 1.25% to about 1.75%.

17. The product as recited in claim 15 wherein said sodium tripolyphosphate is present in an amount ranging from about 1.4% to about 1.6%.

18. The product as recited in claim 1 wherein said member is sodium tripolyphosphate in combination with an alkalizing agent.

19. The product as recited in claim 18 wherein said alkalizing agent is sodium carbonate.

20. The product as recited in claim 19 wherein said sodium tripolyphosphate is present in an amount ranging from about 0.4% to about 0.6% and said sodium carbonate is present in an amount sufficient to provide a pH within the range of from about 7.0 to about 7.5.

21. A method for preparing fabricated seafood products which comprises preparing a blend of a major proportion of seafood meat, and a binding agent comprising (1) a whey protein concentrate composition having at least 30% protein, wherein at least 50% of te protein in the whey protein concentrate composition is whey protein, to which has been added (2) a member selected from the group consisting of:
(a) from about 1.25% to about 3% sodium tripolyphosphate, and (b) from about 0.4 to about 1.25% sodium tripolyphosphate in combination with a food grade, nonphosphorous-containing alkalizing agent, the pH of said fabricated seafood product being within the range of from about 7.0 to about 7.75.

22. The method as recited in claim 21 wherein said seafood meat is shellfish meat.

23. The method as recited in claim 22 wherein said shellfish meat is derived from a crustacea.

24. The method as recited in claim 23 wherein said crustacea is shrimp.

25. The method as recited in claim 24 wherein said shrimp are of a size ranging from about 650 about 1100 per kilogram.

26. The method as recited in claim 21 wherein said binding agent is present in said product prior to cooking in an amount ranging from about 5% to about 50% by weight on a solids basis based on the total weight of the product prior to cooking.

27. The method as recited in claim 21 wherein said composition comprises from about 75% to about 100% by weight of a whey protein concentrate having more than 30% by weight whey protein on a dry solids basis and from about 25% to 0% of another protein containing material.

28. The material as recited in claim 27 wherein said whey protein concentrate is derived by ultrafiltration and has from about 40% to about 60% by weight whey protein on a dry solids basis.

29. The method of claim 28 wherein the whey protein concentrate is derived by ultrafiltering acid whey.

30. The method as recited in claim 21 wherein said whey protein concentrate is a treated concentrate characterized by a lowered gelation temperature and which forms a gel within 30 minutes when an aqueous solution of 15% solids is heated at 70° C.

31. The method as recited in claim 30 wherein said lowered gelation temperature whey protein concentrate is prepared by a process comprising:

(a) adjusting the pH of an aqueous solution of a whey protein concentrate having a temperature of less than about 30° C. to a pH within the range of from about 8 to about 10, the total dissolved protein content being less than about 15% when determined at said pH;

(b) heating the alkaline solution of step (a) to an elevated temperature within the range of from about 50° C. and about 80° C.;

(c) cooling said heated solution to a temperature within the range of from about 30° C. to about 2° C. within 30 minutes after the said solution reaches said elevated temperature, said cooling being conducted at a rate sufficient to prevent gelation of the whey protein containing solution.

32. The method as recited in claim 30 wherein said seafood meat is shellfish meat, and the composition is used in an amount ranging from about 5% to about 50% by weight on a solids basis based on the total weight of the uncooked product.

33. The method as recited in claim 30 wherein said comminuted blend of shellfish and binding agent is extruded in the shape of a shrimp.

34. The product and method as recited in claims 1 or 21 wherein the meat portion of said fabricated food product is substantially 100% shellfish.

35. The method as recited in claim 21 wherein said member is sodium tripolyphosphate.

36. The method as recited in claim 35 wherein said sodium tripolyphosphate is present in an amount ranging from about 1.25% to about 1.75%.

37. The method as recited in claim 35 wherein said sodium tripolyphosphate is present in an amount ranging from about 1.4% to about 1.6%.

38. The method as recited in claim 21 wherein said member is sodium tripolyphosphate in combination with an alkalizing agent.

39. The method as recited in claim 38 wherein said alkalizing agent is sodium carbonate.

40. The method as recited in claim 39 wherein said sodium tripolyphosphate is present in an amount ranging from about 0.4% to about 0.6% and said sodium carbonate is present in an amount sufficient to provide a pH within the range of from about 7.0 to about 7.5.

* * * * *